United States Patent [19]
Wakefield

[11] 3,771,976
[45] Nov. 13, 1973

[54] METAL CARBONITRIDE-COATED ARTICLE AND METHOD OF PRODUCING SAME

[75] Inventor: Gene Felix Wakefield, Richardson, Tex.

[73] Assignee: Texas Instruments Incorporated, Dallas, Tex.

[22] Filed: Jan. 8, 1971

[21] Appl. No.: 105,075

Related U.S. Application Data

[63] Continuation of Ser. No. 769,356, Oct. 21, 1968, abandoned, which is a continuation-in-part of Ser. No. 699,053, Jan. 19, 1968, abandoned.

[52] U.S. Cl................. 29/194, 29/198, 117/106 C, 148/16.6
[51] Int. Cl........................ C23c 11/18, C23c 11/14
[58] Field of Search............ 117/106, 106 D, 106 C, 117/46 CG, 226, 121, 127, 135, 107.2; 148/16.6, 20.3; 29/198, 194

[56] References Cited
UNITED STATES PATENTS

| | | | |
|---|---|---|---|
| 3,656,995 | 4/1972 | Reedy, Jr. | 148/20.3 |
| 3,356,618 | 12/1967 | Rich et al. | 117/106 |
| 3,432,330 | 3/1969 | Diefendorf | 117/46 |

FOREIGN PATENTS OR APPLICATIONS

| | | | |
|---|---|---|---|
| 95,792 | 12/1959 | Czechoslovakia | 117/106 C |

OTHER PUBLICATIONS

Translation of 'L'

Trans. of Electrochemical Soc., Vol. 96 No. 5, Nov. 1949 Campbell et al., p. 318–333.

Powell et al., Vapor Proposition, 5/10/66; p. 377.

Z. Amorg, M. Allegem. Chem. Band. 198, 1931; p. 260–261 plus translation.

Primary Examiner—Alfred L. Leavitt
Assistant Examiner—J. Massie, IV
Attorney—Samuel M. Mims, Jr., James O. Dixon, Melvin Sharp, Richard, Harris & Hubbard, Andrew M. Hassell and Harold Levine

[57] ABSTRACT

Metal carbonitride coatings are deposited on the surface of an article, for example, an article made of graphite or steel, by a process including the steps of elevating the temperature of the article to the proper reaction temperature and passing over the heated article a gaseous stream which will yield hydrogen, nitrogen, carbon and the metal upon contact with the heated article. The gaseous stream can comprise, for example, hydrogen, nitrogen, titanium tetrachloride and a carbon-containing compound such as methane or chlorobenzene. Alternatively, the nitrogen can be derived from a nitrogen-containing compound, in which instance the gaseous stream can contain hydrogen, titanium tetrachloride and a compound such as diaminethylene, pyridine, or trimethylamine, for example.

8 Claims, No Drawings

METAL CARBONITRIDE-COATED ARTICLE AND METHOD OF PRODUCING SAME

This application is a continuation of copending application Ser. No. 769,356, filed Oct. 21, 1968, now abandoned, which is a continuation in part of application Ser. No. 699,053, filed Jan. 19, 1968, now abandoned, entitled "TITANIUM CARBONITRIDE COATED ARTICLE AND METHOD OF PRODUCING SAME."

This invention relates to coatings. In another aspect, this invention relates to vapor deposited coatings of metal carbonitrides.

It has been found desirable to form a composite structure consisting of a surface of one material and a base or substrate of a different material in order to produce articles which are more economical or which exhibit qualities not obtainable with monolithic bodies of the base or surface material.

In the production of machine tools, for example, it is often more economical to form a steel in the desired shape and coat with a harder material such as tungsten carbide or titanium carbide. The difficult and expensive step of machining a dense, solid block of tungsten carbide or titanium carbide into a desired shape is thus avoided.

It is often desirable to utilize the basic properties of a material, but to protect the material from exposure to the environment within which it must function. As mentioned in U.S. Pat. No. 2,972,556, carbon and graphite articles have exceptionally good thermal and electrical properties. However, in some applications where the thermal characteristics of the material could be utilized, such as in a missile nose cone, the material oxidizes in the air under the high temperatures to which it is subjected. The material must, for such application, be coated with a more oxygen-resistant material such as a metal carbide, a metal nitride, or both, as described in U.S. Pat. No. 2,972,556, mentioned above.

In industries such as the semiconductor industry, carbon and graphite articles have been found useful for supporting metal and glass parts in a furnace while effecting glass-to-metal seals, or while joining active elements to metal leads. Additionally, boats or fixtures constructed from carbon or graphite are useful in powder metallurgical applications where a slight oxidizing atmosphere is required. Graphite and carbon articles are also useful in the glass industry for carriers and shaping tools.

However, carbon or graphite articles tend to release carbon particles when exposed to oxidizing atmospheres at high temperatures, thereby contaminating the surrounding atmosphere and causing deterioration of the dimensions of the article. The release of carbon particles in a glass-to-metal seal operation may cause bubbles or voids, while carbon particles released during operations on an active element may short out the element. Further, carbon or graphite are inherently porous and thereby capable of absorbing contaminants.

It has thus been proposed to coat such articles with silicon carbide coatings, but dimensional tolerances have been found difficult to hold, thereby requiring diamond machining and the like, and reaction of the coating with the glass may occur. Due to the disadvantages of graphite and carbon boats or fixtures, solid ceramics have been used, but have been found to be costly and difficult to machine. Additionally, such ceramic articles have poor thermal conductivity, tend to warp and shrink upon sintering, and are easily broken.

In the past, coatings such as titanium carbide have been applied to a substrate such as a metal by exposure of the surface of the metal to a gaseous stream of titanium tetrachloride and methane. The gaseous reactants in the presence of the metal substrate, which was usually elevated to a temperature between 900° C. and 1,200° C., reacted to form titanium carbide that adhered to the surface of the metal. The hydrogen chloride and other product gases formed in the reaction are exhausted from the chamber within which the reaction is conducted. More specific details of such reaction may be found in U.S. Pat. No. 2,962,388 and the description of equipment suitable for applying hard, dense coatings may be found in U.S. Pat. No. 2,884,894.

One of the problems encountered in coating a metal with titanium carbide at temperatures between 900°C. and 1,200°C. is the loss of temper in the metal. It may be generally stated that metals, and in particular steel, or metals such as titanium alloys, are hardened by elevating the metal to about 1,000°C. or greater following which the metal is quickly quenched. The metal after quenching is tempered by elevating the temperature to about 500°C. to 600°C. thus reducing its brittleness and imparting toughness. If a hardened and tempered metal is then reheated to a temperature between 900°C. and 1,200°C. to permit the application of a coat of a hard material, such as titanium carbide, the hardness and temper of the metal is lost during the reheating process. If the metal, after application of the coating, is quenched to again harden the metal, the coating may be damaged as the metal will enlarge during the quenching process which can rupture the coating, create roughness in the coating or cause it to eventually peel from the surface of the metal. Not only is the integrity of the coating damaged, but the metal does not provide as tough a support for the coating necessitating that the coating be thicker to withstand the forces to which it may be subjected.

Therefore, one object of this invention is to provide a novel substance for coating and improving the surface characteristics of substrates.

Another object of this invention is to provide a novel coating which is hard, dense and oxygen resistant for substrates such as graphite, ferrous metals, titanium alloys, and the like.

Still another object of this invention is to provide a novel, hard, dense and oxygen-resistant coating which can be applied to metal substrates at relatively low temperatures to thereby avoid loss of temperature in the metal substrate.

A further object of this invention is to provide a novel process for applying the above-described coating to substrates.

According to the invention, the surface of an article is coated with a solid-solution carbonitride of a metal selected from silicon, boron and the transition metals in groups IVB, VB and VIB of the Periodic Table. The method for coating the article includes the steps of heating the article to the proper reaction temperature and then passing over the surface of the article a vaporous stream which will yield nitrogen, hydrogen, carbon and the metal at the surface temperature of the body to permit reaction of the metal, carbon, and nitrogen thereby forming a solid solution of the metal carbonitride on the body.

The solid-solution metal carbonitride coating of this invention can be applied either at low or high temperatures. For example, low temperature deposition, according to this invention will permit the application of a hard coat to a metal without loss of the hardness and temper which has been imparted to the metal by previous treating steps. However, higher deposition temperatures can be utilized when coating materials having compatible thermal behavior in any step required after the coating operation.

The present invention provides techniques for coating carbon or graphite articles with a metal carbonitride such as titanium carbonitride, thereby providing improved results when the coated articles are utilized in an oxidizing atmosphere at an elevated temperature. The metal carbonitride coating will maintain its shape even though the carbon or graphite body is oxidized underneath the coating. Minute cracks in the metal carbonitride coating will release gas and very small carbon particles, but will prevent the release of large carbon particles which tend to contaminate the surrounding atmosphere. The article according to the invention is thus extremely useful for the previously described applications due to its ease and accuracy of manufacture, its overall cleanliness, and its long life with the attendant maintenance of dimensional tolerances.

Additionally, the metallic carbonitrides can be applied to the surface of the metal used in a metal-to-glass sealing operation. The metallic carbonitride could be applied to the surface of a metal substrate which would ordinarily provide the structural integrity, but would tend to oxidize and react when molten glass was applied thereto. This coating of metallic carbonitride not only provides an acceptable surface for the glass, but prevents the metal substrate from oxidizing and interfering with the glass-sealing operation.

The metal carbonitride coatings applied by the method of the present invention are solid-solution materials having the metal, carbon and nitrogen within a single-phase, crystal lattice. The hardness of the conventional transition metal carbide structures are believed to be derived from the strong bonding forces and difficulty of dislocation movement through the structure. The material titanium carbide has bonds with contributions from metallic, ionic and covalent types. The effects from metallic are slight as indicated from the small number of mobile charge carriers present. The ionic contribution is significant: reportedly approximately 1.33 electrons transferred from the 2p states of carbon to the 3d states of titanium. The presence of covalent (directed orbital) bonds between both nearest and next nearest neighbors has a major influence on the properties, hardness, brittleness, and strength of the material.

The metal carbonitride solutions have crystal structures very similar to the transition metal carbides, but they differ from the carbides in that they can be tailored to have optimized properties by influencing the type and magnitude of the bonds formed. Capability to tailor the bonding and, hence, the properties in these carbonitride structures can result from utilization of the extra valence electron which nitrogen possesses over that of the carbon which is also present in the crystal lattice.

In addition to the hardness of the material, the strong bonding present gives a relatively large surface energy to the material. This large surface energy is believed to render the material less likely to wet and adhere to molten materials such as glass, metals or alloys after it is applied to a substrate.

Not only can the titanium carbonitride exhibit greater hardness than materials such as titanium carbide or titanium nitride, but the deposition rate obtainable with the present invention is approximately two to ten times that of titanium carbide, for example.

The vaporous steam passed over the heated substrate generally contains molecular hydrogen, a carbon-containing compound which readily decomposes at the deposition temperature, a metal-containing compound which readily decomposes at the deposition temperature, molecular nitrogen, and/or a nitrogen-containing compound which readily decomposes at the deposition temperature. Alternatively, the nitrogen and carbon can be supplied from a single compound containing both nitrogen and carbon which readily decomposes at the deposition temperature.

Suitable metal-containing reactant compounds include metal halides. A preferred group of the metal halides is represented by the generic formula $Me(x)_n$ where n is a valence of Me, x is a halogen, e.g., fluorine, chlorine, bromine, and iodine, and Me is selected from silicon, boron, and transition metals in groups IVB, VB, and VIB of the Periodic Table as set forth on page B-2 of the *Handbook of Chemistry and Physics*, Chemical Rubber Company, 45th Edition, (1964). Generally, the transition metal tetrahalides such as titanium tetrachloride are most preferred. However, the transition metal dihalides and trihalides can be useful in some applications, particularly, the higher-temperature coating operations.

Suitable carbon-containing reactant compounds include cyclic and acyclic hydrocarbons having up to about 18 carbon atoms which readily decompose at the deposition temperature. Examples of suitable hydrocarbons include the paraffins such as methane, ethane, propane, butane, pentane, decane, pentadecane, octadecane, and aromatics such as benzene and halogen substituted derivatives thereof.

Suitable reactant compounds containing both carbon and nitrogen include aminoalkenes, pyridines, hydrazines, and alkylamines. Some specific examples include diaminethylene, triamino-ethylene, pyridine, trimethylamine, triethylamine, hydrazine, methylhydrazine, and the like.

The coating process of this invention can occur in conventional equipment. It is preferred that the substrate to be coated be suspended in a reaction chamber and heated to a temperature at which the vaporous reactant materials will decompose when contacted therewith. Thus, the temperature to which the substrate is heated will depend upon the particular reactants employed, but will generally vary within the temperature range of at least about 400°C. to about 1,200°C. For example, a temperature of about 400°C. can be used with a vaporous system of titanium tetrachloride, triaminethylene, hydrogen, and nitrogen, and a temperature of about 950°C. or higher can be used for the system of titanium tetrachloride, chlorobenzene, hydrogen, and nitrogen. After the substrate is properly heated, a vaporous stream containing the reactant compounds is passed directly over the surface of the substrate whereby the deposition of the metallic carbonitride on the substrate occurs. The atomic ratios between the metal and the reactive nitrogen and carbon within the vaporous reactant stream are generally not critical and can be varied with both the type and quantities of the particular reactants utilized, for example.

A better understanding of the invention can be obtained by referring to the following illustrative examples, which are not intended, however, to be unduly limitive of the invention.

EXAMPLE I

A graphite specimen one-half inch by three-fourth inch by 40 mils was supported on a graphite pedestal intermediate the ends of a cylindrical steel reactor having a 6 inch I.D. Through the top of the steel reactor passed an inlet conduit having a 1 inch I.D. which was positioned to discharge gaseous reactants at a point about 2 inches above the top of the graphite specimen or substrate. The bottom of the reactor was fitted with an outlet conduit to permit exhaustion of gases admitted to and generated within the reactor during the coating process to be described in more detail hereafter. Beneath the graphite substrate was positioned a conventional resistance heater powered by a 60 cycle, 440 volt saturable core reactor followed by a step down transformer which could be adjusted to impress from zero to 20 volts across the heater coil. Gaseous reactants for the reactor inlet conduit are derived from a liquid vaporizer vessel which receives its charge from two liquid receptacles. The liquid receptacles, through flow meters, feed into the vaporizer vessel. Liquids from the two liquid receptacles are vaporized in the vaporizer. The vapor generated within the vaporizer is entrained by hydrogen and nitrogen streams which discharge into the vaporizer vessel. After entrainment, the liquid vapors are exhausted from the vaporizer into the reaction chamber through the inlet conduit. With one embodiment of the present invention the graphite substrate was positioned within the reaction chamber and a vacuum pulled on the chamber to exhaust air therefrom. The reactor was then backfilled with nitrogen by way of the nitrogen line which discharges into the vaporizer and from the vaporizer into the reactor. The exhaust line from the reactor was then opened and both hydrogen and nitrogen circulated through the vaporizer and into the reactor at individual rates of 3.25 liters per minute giving a combined rate of 6.50 liters per minute. The resistance heater was actuated and the temperature of the substrate elevated to 1,050°C. After the substrate had reached 1,050°C., chlorobenzene from one of the liquid receptacles was metered into the vaporizer and simultaneously titanium tetrachloride was metered from the second liquid receptacle into the vaporizer. Sufficient quantities of chlorobenzene and titanium tetrachloride were metered into the vaporizer to yield 0.009 liters per minute gaseous chlorobenzene and 0.0045 liters per minute gaseous titanium tetrachloride which were entrained in the 6.50 liter per minute hydrogen and nitrogen stream being passed through the vaporizer. The gaseous stream containing hydrogen, nitrogen, chlorobenzene and titanium tetrachloride was discharged through the inlet line onto the graphite substrate for a period of 30 minutes following which the gas flow was terminated and the substrate permitted to cool to room temperature. The substrate was found to be coated with a solid solution of titanium carbonitride having a hardness of 4,900 KHN/25gm. Deposition rate, based upon weight of the substrate before and after deposition, was found to be 15 mg/cm$^2$.

Table I below provides data on depositions conducted in the described apparatus with varying concentration of the reacting gases.

TABLE I

| H$_2$, liters/ min. | N$_2$, liters/ min. | Gaseous C$_6$H$_5$Cl, liters/min. | Gaseous TiCl$_4$, liters/ min. | Temp., °C. | Time, min. | Weight gain, mg./cm.$^2$ | Hardness, KHN/25 gms. |
|---|---|---|---|---|---|---|---|
| 5 | 1 | .012 | .060 | 1,050 | 30 | 12 | 3,400 |
| 5.5 | 0.01 | .012 | .060 | 1,050 | 30 | 5 | 3,200 |
| 1.3 | 5.2 | .009 | .045 | 1,050 | 30 | 6 | 2,700 |
| 0.3 | 6.2 | .009 | .045 | 1,050 | 30 | 3 | 2,400 |

As will be noted from Table I, the deposition rate as well as the Knoop hardness of the titanium carbonitride coating may be varied by regulation of the concentrations of the hydrogen, nitrogen, chlorobenzene and titanium tetrachloride. In the deposition procedure described in Example I and in those detailed in Table I, the nitrogen which reacts with the carbon yielded by the chlorobenzene and the titanium yielded by the titanium tetrachloride is introduced into the reactor in the form of molecular nitrogen gas. Alternatively, the nitrogen may be yielded in a more reactive atomic form by introduction into the reactor of a nitrogen-containing compound such as a nitrogen-containing hydrocarbon which is decomposable at the temperature at which the deposition is being affected. To be more specific, reference is made to Example II

EXAMPLE II

The apparatus of Example I was used, and the procedure of Example I was followed to prepare the substrate for deposition. The substrate was, however, elevated to a temperature of 900°C. After the substrate had reached the temperature of 900°C., a gaseous stream comprising 4.0 liters per minute hydrogen, 0.08 liters per minute diaminethylene and 0.091 liters per minute titanium tetrachloride was circulated from the vaporizer through the inlet conduit onto the substrate for a period of 15 minutes. The substrate was then allowed to cool and the deposition rate was determined to be 82 mg/cm$^2$ which produced a coating having a hardness of 2,405 KHN/50 gms.

Nitrogen may be introduced both as molecular nitrogen and atomic nitrogen as illustrated by the following example.

EXAMPLE III

The apparatus of Example I was used and the procedure of Example I was followed through steps preparatory to elevation of the temperature of the substrate. In this instance, however, the temperature of the substrate was elevated to 1,100°C. A gaseous stream comprising 3.0 liters per minute hydrogen, 5.0 liters per minute nitrogen, 0.11 liters per minute diaminethylene and 0.090 liters per minute titanium tetrachloride were introduced into the reactor and directed against the substrate for a period of 15 minutes. Following the deposition period, the substrate was permitted to cool and the deposition rate was determined to be 97 mg/cm$^2$. The coating of titanium carbonitride had a hardness of 2257 KHN/50 gms.

EXAMPLE IV

The procedure of Example III was repeated exactly, except the deposition was carried out at 600°C. which resulted in a deposition rate of 8 mg/cm².

EXAMPLE V

A reactor similar to the one used in Example I was used to deposit a titanium carbonitride coating on several stainless steel specimens. The procedure of Example I was followed preparatory to elevation of the temperature of the substrate. However, after the substrate was heated to the proper deposition temperature, a vaporous stream containing hydrogen, nitrogen, titanium tetrachloride and trimethylamine was passed through the reactor inlet conduit and over the stainless steel specimen. The results of these runs are shown in the table below.

TABLE II

| $H_2$, liters/min. | $N_2$, liters/min. | Gaseous $(CH_3)_3N$, liters/min. | $TiCl_4$, gm./min. | Temp., °C. | Time, min. | Weight gain, mg./cm.² | Hardness, KHN/25 gms. |
|---|---|---|---|---|---|---|---|
| 2 | 5.49 | 0.0156 | 0.2 | 428 | 35 | 6.2 | >1,000 |
| 2 | 5.49 | 0.0156 | 0.2 | 550 | 30 | 35 | >2,200 |
| 2 | 5.49 | 0.0156 | 0.2 | 600 | 60 | 79.2 | >2,000 |

As shown in Table II, hard and durable coatings can be applied to a substrate by the process of this invention at relatively low deposition temperatures.

EXAMPLE VI

Several graphite plates for use in glass-to-metal sealing or the like, each approximately 5 inches by 7 inches by one-fourth inch and each having a number of cavities and small holes machined therein were suitably supported within a coating chamber having a volume of 300 liters. Conventional heating mechanism disposed within the chamber enabled the selective application of high temperatures within the chamber. Gas inlet conduits were affixed to the chamber for the introduction of a uniform flow of the reaction gases into the chamber and around the suspended plates. Exhaust lines were also provided for selective exhausting of the gases from within the chamber. Gaseous reactants for the coating chamber were derived from a liquid vaporizer vessel which received its charge from two liquid receptacles. The materials from the liquid receptacles were fed into the liquid vaporizer through flow meters. Liquids from the two liquid receptacles were vaporized by the vaporizer, with the resulting vapors entrained by hydrogen and nitrogen streams which were discharged into the vaporizer. After entrainment, the vapors were exhausted from the vaporizer into the coating chamber through the gas inlet conduits. In one embodiment of the invention, the graphite plates were supported within the chamber. The chamber was then closed and sealed so that a vacuum would be pulled upon the chamber to exhaust the air. The chamber was then filled with nitrogen by way of the nitrogen line discharging through the vaporizer into the coating chamber. The exhaust lines from the chamber were opened and hydrogen and nitrogen circulated through the vaporizer into the chamber at individual rates of 150 liters per minute, while the heating mechanism was activated to elevate the temperature within the coating chamber to 1,050°C. After the plates had reached coating temperature, titanium tetrachloride was metered from one of the receptacles into the vaporizer. Simultaneously, chlorobenzene was metered from the other receptacle into the vaporizer. Sufficient quantities of these liquids were metered into the vaporizer to derive 3 liters per minute of titanium tetrachloride and 1.5 liters per minute of gaseous chlorobenzene, which were entrained in the hydrogen and nitrogen stream passed through the vaporizer into the coating chamber. The gaseous stream containing hydrogen, nitrogen, chlorobenzene and titanium tetrachloride was discharged through the inlet conduits onto the graphite plates for a period of approximately 2 hours. The gas flow was then terminated, the chamber purged of reactant gases utilizing a nitrogen flow, and the plates permitted to cool to room temperature. The plates were found to be uniformly coated, even through the small holes, with a coating of approximately 1.5 mils in thickness of a solid solution coating of titanium carbonitride. Uniformity of coating was assured by the uniform application of reaction gases over the plates and the uniform temperature maintained within the chamber.

While in the above Examples II–V some or all of the nitrogen was yielded by decomposition of the specified compounds containing both carbon and nitrogen, it must be understood that other nitrogen and carbon-containing compounds which are decomposable at the temperature of the deposition can be utilized, such as, for example, pyridine or triaminoethylene or methylhydrazine. Details of depositions conducted using the apparatus described above and pyridine are detailed in Table III below.

EXAMPLE VII

To illustrate the use of other carbon-containing com-

TABLE III

| $H_2$, liters/min. | $N_2$, liters/min. | Gaseous $C_5H_5N$, liters/min. | Gaseous $TiCl_4$, liters/min. | Temp., °C. | Time, min. | Weight gain, mg./cm.² | Hardness, KHN/25 gms. |
|---|---|---|---|---|---|---|---|
| 3.0 | 5.0 | .027 | .083 | 900 | 15 | 86 | 1,508 |
| 3.0 | 0 | .008 | .031 | 1,100 | 15 | 114 | 2,556 | pounds, several stainless steel specimens were coated with titanium carbonitride utilizing a vaporous stream of hydrogen, nitrogen, titanium tetrachloride, and natural gas in the reactor as described in Example I. The natural gas utilized in these runs had the following average analysis.

| Constituent | Amount |
|---|---|
| Methane | 87–91 wt % |
| Ethane | 6.18 wt % |
| Propane | 2.76 wt % |
| N-Butane | 0.88 wt % |
| Isobutane | 0.30 wt % |
| Isopentane | 0.17 wt % |
| Pentane + | 0.21 wt % |
| Nitrogen | 1.19 wt % |
| Carbon dioxide | 0.18 wt % |
| Helium | 0.04 wt % |
| Hydrogen Sulfide | 2ppm |
| Ethyl mercaptan | 0.6 lb/million ft³ |

The individual stainless steel specimen was placed within the reactor and a vacuum pulled on the chamber to exhaust air therefrom. The reactor was then filled with hydrogen and the substrate was heated to 900°C. After the substrate was heated to the reaction temperature the gaseous stream containing the reactants was passed thereover for a period of three hours. The constituents were passed over the substrate at the following rates: hydrogen-150 liters/min; nitrogen-23 liters/min; TiCl$_4$-2.5 milliliters/min; natural gas-21 liters/min.

Each substrate was found to be coated with a very hard solid solution of titanium carbonitride.

The invention, as described above, permits an extremely rapid application of a very hard solid solution of the metal carbonitride coating which may be applied either at high temperatures or at low temperatures, as illustrated by Examples IV and V, to preserve the hardness and temper of metal substrates to which the coatings may be applied.

In addition to eliminating the subsequent heat treatment required, less distortion or warping of articles will result at the low-temperature deposition. Low temperatures of deposition also permit application of coatings to an article which could not be successfully coated at higher temperatures due to the difference in the coefficient of expansion of the two materials. Also, by coating at lower temperatures, the residual stress between the coating and the substrate will be less after cooling.

Various substrates may be coated by the process of the present invention including ferrous metals, titanium, ceramic materials, and refractory metals such as tungsten, molybdenum, niobium and tantalum. It will be understood that the metal carbonitride may be produced in bulk by coating a substrate to which the coating will not adhere or from which it can be removed.

It should be appreciated that the sources of the nitrogen, carbon and the metal may take various forms. For example, compounds having all three elements in their molecular structure may serve as a source for the three elements. It is only necessary that the three be present in a reactable state when they contact the surface of the substrate.

The carbon, nitrogen, and metal components can be brought to the reactive state by any suitable technique. As described above, a vaporous reactant stream containing the three components can be passed over a heated substrate to thereby yield the three components in the reactive or activated state. Additionally, it is within the scope of this invention to utilize any other technique which yields the three components in the activated state within the vaporous reactant stream which is passed over the substrate.

While rather specific terms have been used in describing various embodiments of the present invention, they are not intended nor should they be implied as a limitation upon the invention defined by the following claims.

What is claimed is:

1. A method of coating a tempered substrate selected from steel, titanium and titanium alloys with a solid solution layer of a carbonitride of a metal selected from silicon and the transition metals in Groups IVB, VB, and VIB, comprising:

heating said substrate to a temperature of 400° C. to 600° C., contacting said substrate with a gaseous stream containing said metal, carbon, hydrogen and nitrogen under conditions and in proportions to yield said metal, carbon and nitrogen in the reactive state and permit reaction thereof to form said solid solution layer on said substrate.

2. The method of claim 1 wherein said gaseous stream contains molecular hydrogen, nitrogen, an organic compound and a halide of said metal which are reactable at the temperature of the substrate.

3. The method of claim 1 wherein said gaseous stream contains molecular hydrogen, a halide of said metal, and a nitrogen-containing organic compound which are reactable at the temperature of the substrate.

4. The method of claim 3 wherein said halide is titanium tetrachloride and said nitrogen-containing compound is diaminethylene.

5. The method of claim 3 wherein said halide is titanium tetra-chloride and said nitrogen-containing compound is trimethylamine.

6. A method of coating a tempered substrate selected from steel, titanium and titanium alloys with a layer of titanium carbonitride comprising heating said substrate to a temperature of 400° to 600° C. and contacting said heated substrate with a gaseous or vaporous reactant stream comprising molecular hydrogen, molecular nitrogen, a titanium compound which readily decomposes at the substrate temperature and a carbon-containing compound which readily decomposes at the substrate temperature, said carbon-containing compound being selected from the group consisting of methane, ethane, propane, butane, pentane, decane, pentadecane, octadecane, benzene, butane, pentane, decane, pentadecane, octadecane, benzene, chlorobenzene, diaminethylene, triaminoethylene, pyridine, trimethylamine, triethylamine, hydrazine, and methylhydrazine.

7. An article comprising:
a. a body of a tempered substrate selected from steel, titanium and titanium alloys having a pre-selected configuration; and
b. a homogeneous solid solution of a carbonitride of a metal, said metal selected from the group consisting of silicon and the transition metals of groups IVB, VB, and VIB formed on the surface of said body.

8. The article defined by claim 7 wherein said homogeneous solid solution is titanium carbonitride.

* * * * *